July 17, 1956     K. E. REESE     2,754,801
APPARATUS FOR CONVEYING FEED IN A POULTRY HOUSE
Filed Sept. 17, 1951     4 Sheets-Sheet 4
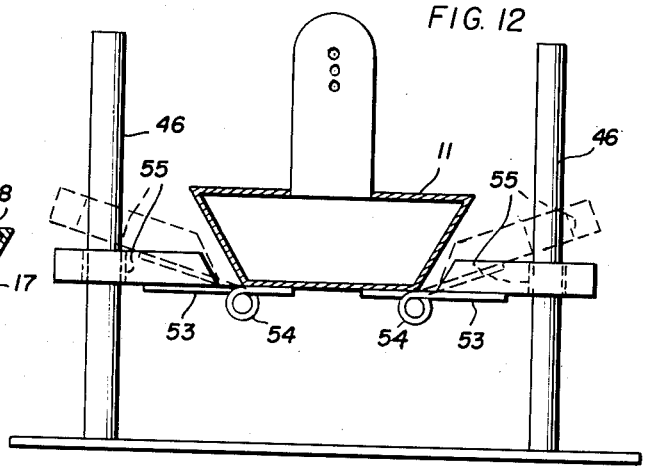
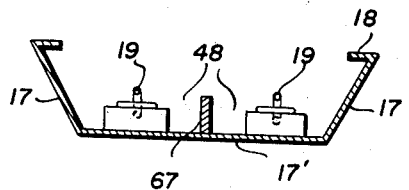
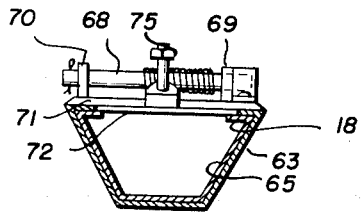
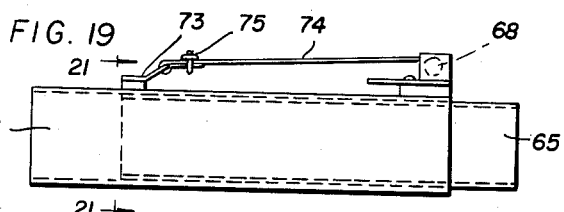
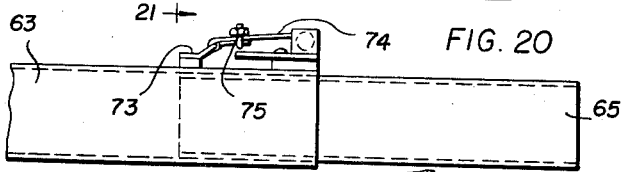
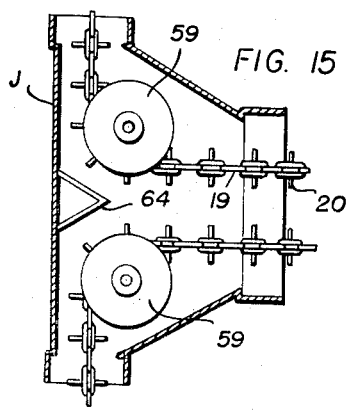
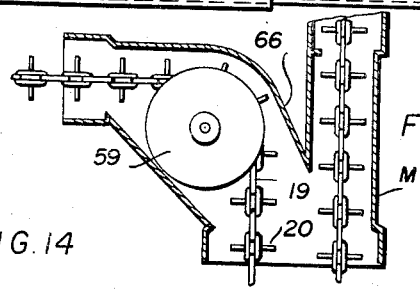
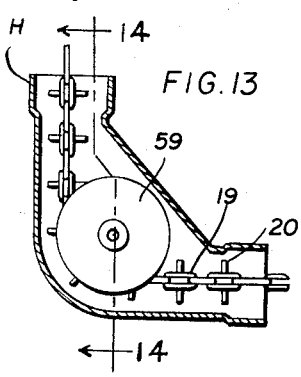
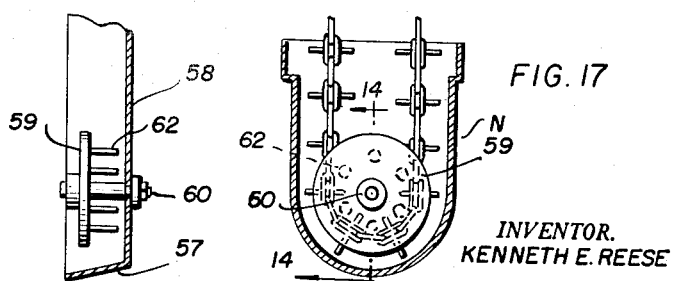
INVENTOR.
KENNETH E. REESE
BY
ATTORNEY United States Patent Office 2,754,801
Patented July 17, 1956

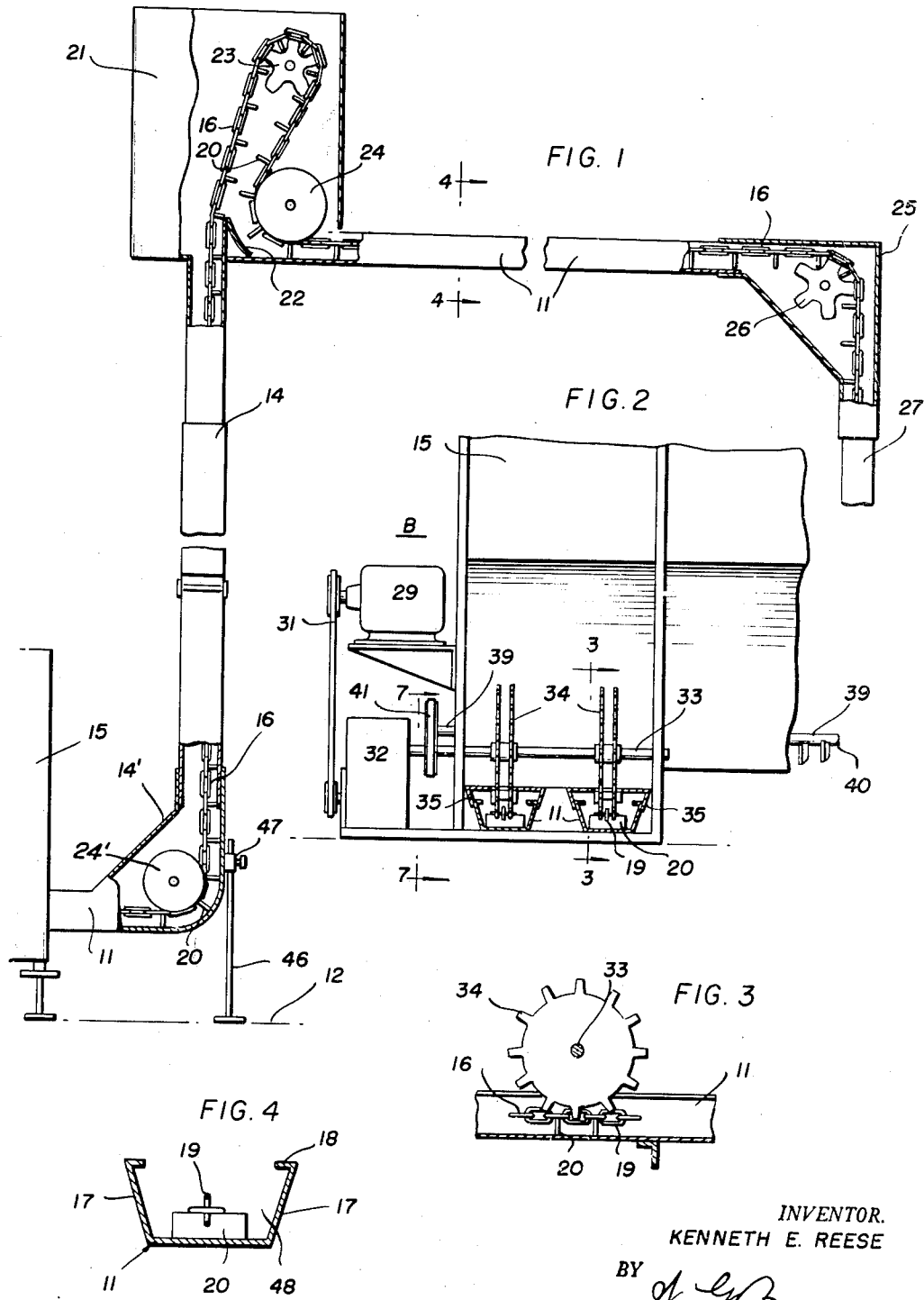
July 17, 1956
K. E. REESE
2,754,801
APPARATUS FOR CONVEYING FEED IN A POULTRY HOUSE
Filed Sept. 17, 1951
4 Sheets-Sheet 1
INVENTOR.
KENNETH E. REESE
BY
ATTORNEY July 17, 1956
K. E. REESE
2,754,801
APPARATUS FOR CONVEYING FEED IN A POULTRY HOUSE
Filed Sept. 17, 1951
4 Sheets-Sheet 2
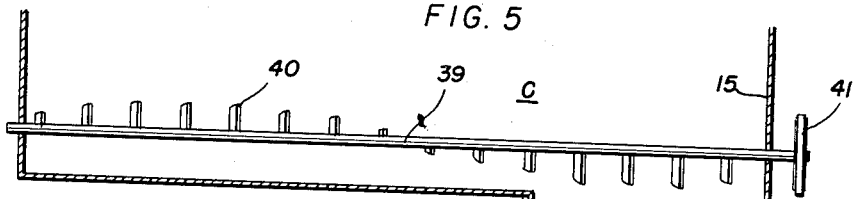
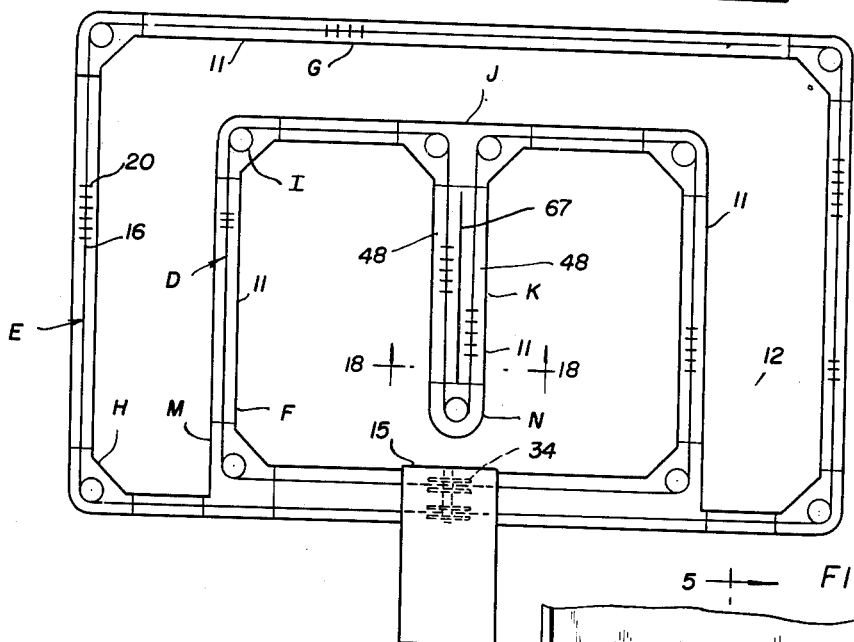
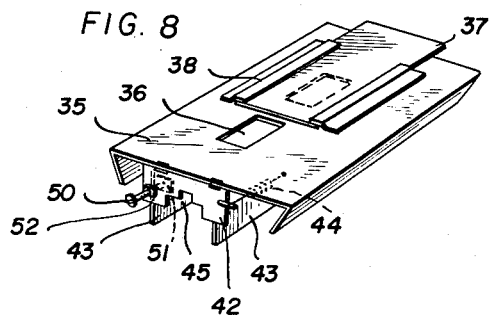
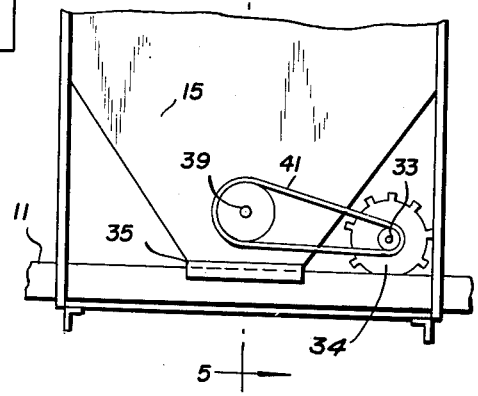
INVENTOR.
KENNETH E. REESE
BY
ATTORNEY

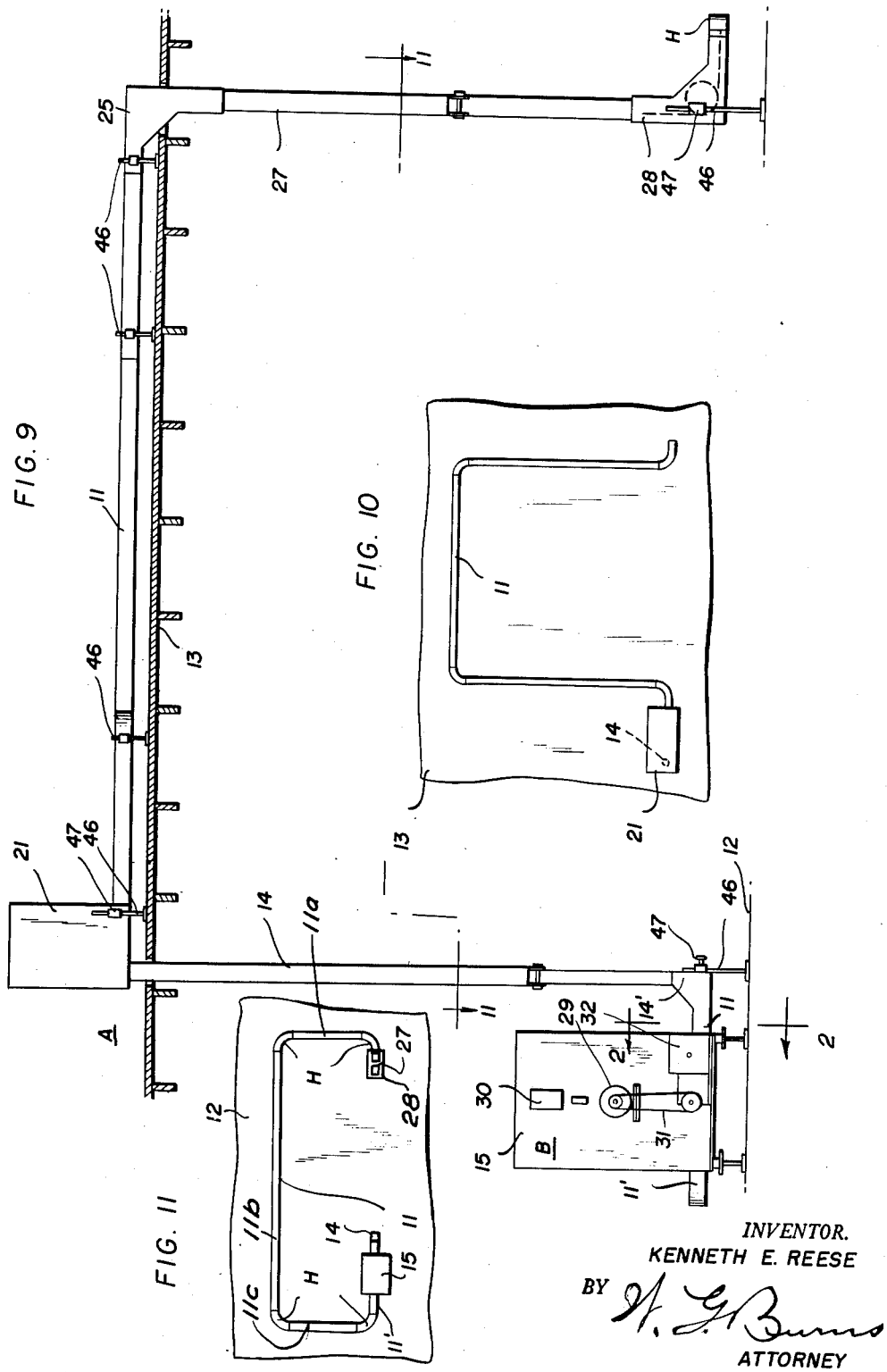

2,754,801

APPARATUS FOR CONVEYING FEED IN A POULTRY HOUSE

Kenneth E. Reese, Elkhart, Ind.

Application September 17, 1951, Serial No. 246,995

21 Claims. (Cl. 119—52)

This invention relates to improvements in apparatus for distributing feed in a poultry house.

This application is a continuation in part of my co-pending application, Serial No. 185,774, filed September 20, 1950, and abandoned subsequent to the filing date of the present application.

Generally, where a large number of fowl are housed in a building and fed by a feed distributing apparatus, difficulty has been experienced in conveying the feed in proper quantities uniformly distributed so all the fowl are supplied in equal amounts periodically which usually entails considerable personal effort upon the part of attendants.

An object of the instant invention is to afford an apparatus for uniformly distributing feed for fowl harbored on one or more floors of a building for feeding purposes which requires but slight attention upon the part of operatives.

Another object of the invention is to construct the apparatus in such manner that the feed is distributed over extensive areas in a building occupied by the fowl periodically in definite predetermined quantities as may be required to supply sufficient feed needed by the entire flock within the building.

Still another object of the invention is to provide in the conveying apparatus for distributing poultry feed, suitable guiding, supporting and adjusting mechanism whereby the conveyor may selectively be arranged within a particular poultry house in accordance with the design of that house to provide efficient feeding, and whereby the conveyor apparatus may be supported on uneven floors and the like, or readily disassembled and rearranged, and whereby after the conveyor is assembled in the desired arrangement the chain may be adjusted to provide efficient and fool-proof operation.

Other objects and advantages of the invention appear in the following description.

An illustrative embodiment of the invention is shown in the accompanying drawings, in which:

Fig. 1 is a fragmentary side elevational view of apparatus in which the invention is incorporated;

Fig. 2 is a fragmentary view drawn on an enlarged scale and partially in elevation and partially in section taken substantially on the line 2—2 of Figure 9 and showing the activating means for the conveyors used in the apparatus;

Fig. 3 is a detail view showing one of the sprockets for driving the conveyors, the view being in section on the line 3—3 of Fig. 2;

Fig. 4 is a detail view on an enlarged scale showing a transverse section of one of the feed troughs, the section being on the line 4—4 of Fig. 1;

Fig. 5 is a fragmentary longitudinal section on an enlarged scale of the feed hopper forming part of the apparatus taken on a mid-section with the sprockets omitted;

Fig. 6 is a diagram showing a top plan view of the feed troughs as they are arranged in a preferable form;

Fig. 7 is a fragmentary vertical section on an enlarged scale of the transmission mechanism for the conveyors, the section being on the line 7—7 of Fig. 2;

Fig. 8 is a detail perspective view on an enlarged scale of the feed regulating mechanism for controlling the supply of feed from the hopper into the feed troughs;

Fig. 9 is a fragmentary side elevational view of the hopper, conduit, a housing, and contiguous feed trough;

Fig. 10 is a fragmentary top plan view, drawn to a reduced scale, showing the housing and contiguous feed trough;

Fig. 11 is a sectional view taken on line 11—11 of Fig. 9, drawn to a reduced scale and showing the arrangement of the feed trough on the ground floor of a building;

Fig. 12 illustrates a modification of a trough supporting structure;

Fig. 13 is a detailed view on an enlarged scale of an angular housing such as those shown in the corners of the conveyor system in Fig. 6;

Fig. 14 is a cross-sectional view taken on line 14—14 of Fig. 13 with chain omitted;

Fig. 15 is a detailed view on an enlarged scale showing a T-shaped housing such as that shown schematically in Fig. 6;

Fig. 16 is a detailed view on an enlarged scale showing an angular housing adapted to connect a double trough to two single troughs such as shown in Fig. 6;

Fig. 17 is a detailed view on an enlarged scale of an end housing for a double trough such as that shown in Fig. 6;

Fig. 18 is a cross-sectional view on an enlarged scale taken on line 18—18 of Fig. 6;

Fig. 19 is a fragmentary detailed view on an enlarged scale of a chain adjusting mechanism;

Fig. 20 is a fragmentary detailed view of an adjustment mechanism in the expanded or tightened position;

Fig. 21 is a cross sectional view taken on line 21—21 of Fig. 19.

The illustrative embodiment of the invention consists of a series of feed troughs 11 arranged in groups over various floors 12—13 of a building indicated generally by A, the troughs on the upper floor 13 being connected with a vertical conduit 14 that has communication with a feed hopper 15 through an angular housing 14' from which feed is supplied by means of a conveyor 16 that travels through the hopper, the conduit and the troughs.

The troughs (Fig. 4) each have side walls 17 provided along their upper edges with inwardly projecting flanges 18 and extend through the lower portion of the hopper 15.

The conveyors used in this apparatus each consists of a kink-proof link chain 19 on which are transversely disposed feed engaging flights or drags 20 located thereon at suitable intervals, that are moved as the chain travels in the trough 11 and through the conduit 14. Flights 20 (Fig. 4) may consist of generally rectangular plates suitably welded or otherwise fixed to alternate links of chain 19. In the illustrated embodiment of the invention, the chain 19 comprises links alternately in horizontal and vertical positions and the feed engaging flights 20 are carried by the horizontal links and extend downwardly from the plane of the chain substantially to contact with the bottoms of the troughs 11 and housings H. Flights 20 are adapted to be moved by chain 19 along the bottom of trough 11 the lower edge of the drags riding on the bottoms of the troughs and housings H. Thus there is provided spaces which may be filled with feed, the feed being pushed or drawn along the trough in a positive manner. The conveyors are endless and operate as belts and travel through the hopper, the vertical conduit 14, the troughs 11 connected therewith and other channels hereinafter mentioned, when the apparatus is in action. When a given drag 20 moves upwardly through the vertical conduit 14 it carries with it a quantity of feed whereby there is continuous flow of feed up through conduit 14.

The upper end of conduit 14 enters into a housing 21 situated on the second floor 13 of the building and there is provided in the housing a dam 22 from which feed passing up through the conduit overflows into the adjacent trough 11 which is also connected with the housing at the bottom thereof. Thus each drag 20 discharges feed over the dam 22 where it flows onto the bottom of housing 21. In the upper part of the housing is disposed an idler 23 over which the conveyor 16 travels, and there is provided another idler 24 under which the conveyor travels on its way into adjacent trough 11. Thus, as the feed elevated through the conduit 14 by the conveyor blades 20 is discharged over dam 22 it is again engaged by the descending blades traveling around idler 24 and progressed through the trough.

Connected with the far end of the trough 11, on the second floor of the building, is a hollow angular housing 25 having disposed therein an idler 26 over which the conveyor 16 rides. While the drags are passing over idler 26 the feed drops along the sloping bottom of housing 25 and slides into engagement with blades moving downwardly. The lower end of angular housing 25 is connected to a downspout 27 through which surplus feed which has not been consumed in the trough 11 on the second floor of the building is eventually delivered back to the hopper. If so desired the lower end of the downspout 27 may be connected with another angular housing 28 (Fig. 9) which may be connected by angular housings H and trough portions 11a, 11b and 11c (Figure 11) to the lower end of the hopper as indicated at 11'. The angular housings and trough connections between the housing 28 and the entry to the lower part of the housing at 11' are omitted in Figure 9 in view of the showing in Figure 11. The conveyor 16 travels through the downspout 27 supporting the feed during its descent. This prevents separation of the various components of the feed which would ordinarily occur if it were allowed to drop freely through the spout 27. Conveyor 16 travels through angular housing 28 into the adjacent trough 11 and from thence continues through trough portions 11a, 11b and 11c and angular housings H (Figure 11) into the lower end of the hopper as indicated at 11'. Fig. 11 illustrates an arrangement of trough portions 11a, 11b and 11c on the ground floor of a building. In order to move the conveyor through trough 11' with the drags 20 contacting the bottom of the trough a horizontally disposed angular housing such as housing H, illustrated in Fig. 6, may be connected to the lower portion of housing 28. Housing H will be described in more detail subsequently. By providing three more horizontal angular housings similar to housing H trough 11' may be arranged to describe a rectangular path for conveyor 16 such as that illustrated in Fig. 11. Thus trough 11' may be led back into the lower end of the hopper 15.

In this manner the conveyor is routed from the lower part of the hopper 15, through adjacent feed trough 11, around idler 24', up through the conduit 14 into the housing 21 and adjacent feed troughs 11 connected therewith, and from thence through the downspout 27 and contiguous troughs back into the hopper. Mounted in connection with the hopper (Fig. 2) is a power driven actuating means, indicated generally by B, for the apparatus. Preferably, the activating means includes an electric motor 29 controlled by an ordinary time switch 30. A time switch is provided for periodically energizing the motor whereby the conveyor 16 fills trough 11 with feed. The time interval of operation of switch 30 may be determined experimentally in accordance with the rate of consumption by the fowl of the feed in the trough. The motor is connected by means of a belt 31 with a back gear mechanism 32 of usual construction and that has extending therefrom a drive shaft 33 on which are secured sprocket wheels 34 which are rotatable on a substantially horizontal axis overlying and extending across the direction of travel of the chains 19 and have operative or driving engagement with the corresponding conveyor chains 19. The arrangement is such that upon operation of the motor the conveyors are progressed through the channels therefor provided by the troughs, angular housings, conduit, housing 21, adjacent group of troughs 11, downspout 27, the group of troughs adjacent thereto (shown in Fig. 11) and back into the hopper, thus completing a circuitous movement.

As a means to regulate the maximum amount of feed that passes from the hopper into the troughs located in the bottom thereof, there are provided (Fig. 8) a cover 35 for each trough having a feed opening 36 therein, and a sliding plate 37 is arranged on each cover, provided with guides 38, which is adapted to overlap more or less the feed opening according to adjustment of the plates. In this manner the quantity of feed entering the trough is varied. For example, the sliding plate 37 may be adjusted to insure that enough feed flows out of the hopper into the spaces between the drags 20 to fill those spaces regardless of the rate of travel of conveyor 16.

Within the hopper (Fig. 5) there is disposed a rotatable agitator, shown generally by C, having an operating shaft 39 from which extend a spiral series of fingers 40. The shaft has on one end thereof a pulley that is connected with the drive shaft 33 by means of a belt 41 so that the agitator is revolved when the motor is in action, thus causing feed in the hopper to have movement toward the feed openings. It should be noted that the fingers 40 are mounted on shaft 39 at an angle to the axis of that shaft to provide horizontal as well as vertical movement of the feed. In Fig. 5 the fingers 40 are set at an angle to move feed to the right toward the troughs 11 whereby it is insured that the feed will not become packed or bridged and stop flowing into the troughs.

On one end of each cover 35 is a pendant hinged scraper gate 42 that is biased to move against the ends of spaced guides 43 secured to the cover, there being a tension spring 44 by which the opening movement of the gate is restrained. The lower end of the gate is notched as indicated by 45 to permit the gate to loosely straddle the corresponding conveyor chain 19 and permit free movement thereof past the gate. The amount of feed moved by the conveyor may be adjusted by means of a bolt 50 threaded in the gate 42 and arranged to bear on a tab or stop member 51 which may be fixed to one of the guide members 43. Bolt 50 may be rotatably adjusted to limit the closing movement of the gate 42 whereby it may be adjusted to pass a predetermined amount of feed. The adjustment of bolt 50 may be fixed by means of a nut 52 threaded thereon and movable on bolt 50 into engagement with the surface of gate 42. In this manner an excessive amount of feed moved by the conveyor is prevented. For example, gate 42 may be adjusted to allow a certain depth of feed to be scraped or moved by the drags 20. The depth of feed may be determined by the rate of consumption of feed by the fowl, and the rate of speed of the conveyor. This operation will be described in more detail subsequently.

Fig. 6 is a schematic diagram showing a top plan view of an adaptation of the invention in which two conveyors D and E travel separately in corresponding channels formed by the units F and G. In this instance, each unit is made up of aligned groups of troughs 11 connected together or merging into angular or direction changing housings H having therein an idler I, similar to those in the previously mentioned angular housings, on which the corresponding conveyors travel. In the trough unit F there is included a T-shaped or direction changing housing J having similar idlers therein for the conveyor, thus permitting a loop extension K of the unit D to be formed. There is also included in unit F a terminal or direction changing housing N into which the adjacent troughs 11 merge and including an idler whereby the conveyor may travel in a double trough such as that shown in the loop extension K. In this example of the invention the conveyors are actuated respectively by the sprocket wheels as in the former instance. For guiding the conveyor from the double trough adjacent the idlers into the channels formed by the units F there are provided housings M such as those shown in Fig. 16 of the drawings. This adaptation of the invention illustrates the manner in which the conveyor system may be arranged within a given house for providing adequate feeding space for the fowl. The arrangement of the troughs is determined by the number of fowl in the house and the linear footage of feeding space needed for each particular fowl. In some cases the loop extension K would not be required, and therefore the unit J could be omitted to provide a continuous length of trough in its place.

Preferably, parts forming the channels through which the conveyor travels, such as the angular housing 14' housing 21, angular housings 25 and 28 are supported adjustably above the respective floors of the building upon posts 46 that rest upon the floors and are adjustably connected with the corresponding parts as indicated by adjustable cooperation between posts 46 and brackets 47 on the adjustably supported parts. By this means the channel members including the troughs are positioned in proper levels or inclines above the floors as desired, and thus is compensated any irregularities in the floors of the buildings.

Fig. 12 of the drawings illustrates a modification of the trough supporting members. Posts 46 may be erected at intervals calculated to afford adequate support for the trough. Cooperating with posts 46 there may be provided a pair of supporting members 53 pivoted or hinged at their inner ends to the bottom of the trough by means of any suitable pivot or hinge member 54. The support members 53 may have apertures 55 formed therein for permitting members 53 to be superimposed over posts 46. Apertures 55 may be dimensioned to be slightly oversize with respect to a post whereby a member 53 may be tilted to bind against the inner and outer surfaces of posts 46 thereby to hold trough 11 at any desired height. When it is desired to adjust the height of trough 11, members 53 may be moved into a horizontal position with respect to posts 46 and the trough may be lowered or elevated to the desired height above the floor level. Then the members 53 may be rotated about their pivots until the walls of apertures 55 engage the surfaces of posts 46 and bind with respect thereto to afford a supporting engagement between posts 46 and members 53. Thus, even though the floor of a poultry house may be uneven or sloping, trough 11 may be adjusted to a predetermined height above the floor level at all points whereby the fowl may obtain feed from trough 11.

Figs. 13, 14, 15, 16 and 17 illustrate in detail angular housings adapted to guide conveyor chain 19 in such a manner that the feed passes around corners or through double troughs in the conveyor system such as that illustrated in Fig. 6. The angular housing H is illustrated in detail in Fig. 13. Housing H consists of a sheet metal casing having vertical sides and a horizontal floor as illustrated in Fig. 14. Floor member 58 supports an idler 59 which may be rotatably mounted by means of a shaft 60 fixed to floor 58 by means of a nut or any other suitable fastening device. Idlers or pulleys 59 mounted on substantially vertical axes in the housings H, J and N each includes a plurality of chain engaging portions or spokes 62 adapted to engage link chain 19 between the drags 20 for guiding the chain and maintaining the drags in constant contact with the floor, thereby to insure movement of feed around a corner. The pulleys 59 have clearance or flight receiving openings between the chain engaging portions and the chain 19 within the housings is in engagement with the chain engaging portions with at least one flight in the clearance or in one of the flight receiving openings. Chain 19 may move feed through the angular housing 19 with no appreciable obstruction on the part of the idler 59. This is due to the fact that spokes 62 not only serve to guide chain 19 but they tend to move feed instead of impeding its movement. Angular housing H serves to guide chain 19 wherever it is desired to provide a right angle turn in the conveyor system.

Fig. 15 shows a T-housing such as J illustrated in Fig. 6. This housing supports a pair of spaced idler wheels 59 identical in construction to wheel 59 illustrated in Fig. 13 and mounted on the bottom of the housing in the same manner as illustrated in Fig. 14. T-housing J includes a baffle member 64 having angular walls fixed to the vertical wall of housing J between the idler pulleys 59 in such a manner that the conveyor chain and the drags clear member 64. This baffle member serves to guide feed or deflect feed in accordance with the motion of the conveyor chain whereby feed does not pile up between the idlers 59. Housing J may be constructed of sheet metal in the same manner as housing H and its construction details will be obvious from inspection of Fig. 15.

Fig. 16 illustrates details of the housing M illustrated in Fig. 6. As in the angular housing H there is provided an idler pulley 59 mounted in the same manner as illustrated in Figs. 13 and 14. This housing includes a baffle member 66 which serves to guide feed as it is being moved by the two parts of the chain 19. This housing is adapted to join a double feed trough such as that illustrated in the lower portion of Fig. 6 with two single feed troughs disposed at right angles to one another. Accordingly, the baffle 66 guides feed along the respective paths of the two conveyor chains preventing accumulation of feed between the chains and insuring movement of feed along the respective paths of the chain.

Fig. 17 of the drawings illustrates a U-shaped housing N which is adapted to terminate a double trough such as K illustrated in Fig. 6. This housing includes an idler 59 constructed identically to that illustrated in Figs. 13 and 14. The walls of the housing N are U-shaped as illustrated whereby feed may be guided around the periphery of idler 59.

Fig. 18 illustrates in detail a double trough such as trough K illustrated diagrammatically in Fig. 6. It is similar in construction to the trough shown in Fig. 4 except that the bottom is slightly more than double the width of the bottom of the trough illustrated in Fig. 4. A partition 67 is mounted vertically in the midportion of the bottom 17' whereby there is separation between the chains 19 and feed moved by each chain flows in an independent stream on each side of the partition. This prevents any feed from accumulating in the midportion of the trough.

Figs. 19, 20 and 21 of the drawings illustrate an apparatus for adjusting the tension of chain 19. When a conveyor system is installed, it may be arranged that the ends of two adjoining trough members 63 and 65 may be overlapped as illustrated in Fig. 19 one trough telescoping within the end of the other. To the exterior trough there may be fixed the rotatable shaft 68. This shaft may be mounted in a pair of collars 69 and 70 which may be welded or otherwise secured to a cross member 71 fixed to trough 63. To the end of the interior trough there may be fixed an eye 73 by means of a cross member 72 welded across the flanges 18. A cable 74 may be passed through the eye 73 and permanently fixed thereto by means of a U-shaped clamp member 75. The other end of cable 74 may be passed around the shaft 68 and anchored thereto in any conventional way. By affixing a crank to shaft 68 cable 74 may be wound around shaft 68 drawing the interior and exterior troughs apart or away from one another by shortening cable 74 as illustrated in Fig. 20. In this manner the section of the trough in which the adjustment is provided will be lengthened until such time as chain 19 is under sufficient tension to provide satisfactory operation. Shaft 68 may be provided with a ratchet and pawl mechanism (not shown) for locking it in its adjusted position.

*Operation*

In operating the invention to convey feed, the hopper 15 is filled with feed, and when the motor is turned on the agitator C and the sprocket wheel 34 are revolved causing the feed in the hopper to move toward the feed openings and the conveyors to travel in the channels therefor provided.

The feed passes from the hopper through the feed openings 36 in variable quantities, depending upon the adjustment of the plates 37 into the underlying troughs 11. These plates may be adjusted after experimental use to insure that, regardless of the speed of the conveyor, the entire space between the member 35 and the bottom of trough 11 will be filled. From thence the feed is conveyed past the gates 42 and onward through the conveyor channels so the feed becomes distributed in the troughs especially into the spaces 48 between the opposite sides of the troughs and the ends of the drags 20. The fowl have access to the feed in the troughs through the open tops thereof and are fed until satisfied or to the extent that the feed is supplied.

The feeding periods may be regulated by adjustment of the conventional time switch indicated at 30 by which the motor is controlled. The feeding period may be determined by experiment. For example, it may be found that in two hours a flock of a given number of fowl will consume a trough full of feed. The time switch may then be adjusted to energize the motor every two hours and drive the conveyor a predetermined length of time, also found by experiment, such as fifteen minutes, which period must be long enough to allow the conveyor to circulate feed until the entire length of trough is full of feed. Experimental use shows that when the motor is energized, the sound attracts the fowl and they start to feed immediately, whereby feed is being consumed during the operation of the conveyor. Therefore, the gate 42 may be adjusted by means of the bolt 50 to provide a sufficient depth of feed that the conveyor will move enough feed to satisfy the consumption during its period of operation and also to fill the conveyor within the operation period. The chain may complete a plurality of circuits before filling the conveyor in which case it is refilled as it passes under the hopper. It is preferable that the time switch operate before the troughs become completely empty, thus insuring that feed is available at all times to the fowl. Of course, the rate of consumption of a given flock of fowl increases with the ages of the fowl. This increase in consumption may be compensated by lengthening the period of operation of the conveyor and also by adjusting the gate 42 to permit a greater depth of feed to be moved by the conveyor.

In mechanical operation, the motor 29 drives the sprocket wheels 34 which are adapted to engage the drags 20 thereby to impart motion to the chain 19. As illustrated in the drawings chain 19 comprises alternate horizontal and vertical links or loops which provide universal angular movement of the chain. Thus, as the chain emerges from the hopper 15 and passes through a vertical angle around the idler in the angular housing 14', drags 20 are maintained in contact with the bottom of the casing and move in contact with the side of the chute 14 thereby imparting positive movement upwardly to the feed. As the chain emerges into the housing 21 it drops over the dam 22 into position to be engaged by drags passing around the periphery of idler 24. The arrangement of idler 23 in the upper part of the housing permits the chain to be passed through an angle of 90 degrees from the vertical to the horizontal while the arrangement of idler 24 and dam 22 permit the feed to move through this vertical angle.

Chain 19 traverses trough 11 into the angular housing 25 and around the sprocket 26, the feed dropping along the lower surface of the housing into contact with the drags which are moving vertically downward. Since these drags contact the surface of the chute 27 the feed is lowered under positive control thereby preventing free falling and separation of the various components of the feed. As in the case of the housing 14' the chain passes around a similar sprocket in the angular housing 28 and into the trough 11. Because of the universal action of the vertical and horizontal links of the chain, the chain may travel through a 90 degree horizontal angle as illustrated in Fig. 11. Figs. 13, 14, 15, 16 and 17 illustrate the various structures which permit the chain to travel through the horizontal angles with the drags always contacting the bottom of the trough. Thus the advantages of the particular type of chain become apparent in that it permits the chain to traverse vertical and horizontal angles always maintaining the drags in contact with the bottom of the trough for imparting positive motion to the feed. It should also be noted that the particular type of sprocket wheels used in the horizontal housings such as those shown in Figs. 13 to 17 permit the chain to travel through angles of 90 degrees or even 180 degrees with the drags in contact with the floors or bottoms of the troughs or housings. From the foregoing description it is apparent that the conveyor is constructed to impart positive and continuous motion to the feed even though it traverses horizontal and vertical angles.

Variations from the particular construction above disclosed may be resorted to by the exercise of skill in the art, without departure from the spirit or scope of the invention.

What I claim is:

1. In a stock feeder of the type having a continuous circuit, a conveyor therefor comprising an open-top trough merging into a direction changing housing, a pulley mounted in said housing on a substantially vertical axis, a kink-proof chain extending along said trough and through said housing about said pulley, and feed engaging flights on said chain and extending downwardly and substantially transversely from the longitudinal axis of said chain substantially to contact with the bottom of said trough and housing, said pulley having spaced chain engaging portions with flight receiving clearance therebetween, said chain within said housing being in engagement with said chain engaging portions of said pulley with said flights travelling about the pulley in the plane of said pulley and at least one of said flights being in said clearance between said chain engaging portions.

2. A stock feeder according to claim 1 wherein said trough merges into a second direction changing housing which merges into a substantially vertical conduit, and a second pulley mounted in said second housing on a substantially horizontal axis, said chain extending about said second pulley and along said vertical conduit for conveying feed between different elevations.

3. A stock feeder according to claim 1 wherein said chain comprises links alternately in horizontal and vertical positions and said feed engaging flights are carried by said horizontal links.

4. A stock feeder according to claim 1 wherein there is driving means comprising a driving sprocket having a shaft mounted for rotation on a substantially horizontal axis and overlying and extending across the direction of travel of said chain and operatively associated with said chain for advancing it along said trough and through said housing.

5. A stock feeder according to claim 1 wherein there is a second conveyor comprising a second open-top trough merging into a second direction changing housing, a second pulley mounted in said second housing on a substantially vertical axis, a second kink-proof chain extending along said second trough and through said second housing about said second pulley, feed engaging flights on said second chain and extending downwardly and substantially transversely from the longitudinal axis of said chain substantially to contact with the bottom of said second trough and housing, said second pulley having spaced chain engaging portions with flight receiving clearance therebetween, said second chain within said second housing being in engagement with said chain engaging portions of said second pulley and at least one of said flights thereof being in said clearance between said chain engaging portions, and driving means comprising a plurality of driving sprockets mounted for rotation on a common substantially horizontal axis overlying and extending across the directions of travel of both said chains, one of said sprockets being operatively associated with each said chains for advancing said chains along said troughs and through said housings.

6. A stock feeder according to claim 1 wherein said trough merges into a second direction changing housing merging into a substantially vertical conduit, a second pulley mounted in said second housing on a substantially horizontal axis, said chain extending through said second housing about said second pulley and along said vertical conduit for conveying feed to a higher elevation, the upper end of said vertical conduit merging into a third housing, said third housing merging into a second conveyor comprising a second open-top trough, and a dam and upper and lower pulleys in said third housing, said chain extending through said third housing over said dam over which the feed overflows, said chain extending about said upper and lower pulleys in said third housing for engagement of the flights of said chain with the feed which overflows said dam for distributing said feed through said second trough.

7. A stock feeder according to claim 1 wherein said trough merges into a second direction changing housing merging into a substantially vertical conduit, said vertical conduit merging at its upper end into a third housing which merges into a second conveyor comprising a second open-top trough, and pulley means in said third housing, said chain extending through said third housing about said pulley means and along said second trough.

8. A stock feeder of the type having a continuous circuit, a conveyor therefor comprising an open-top trough merging into a direction changing housing, a pulley mounted in said housing on a substantially vertical axis, and a kink-proof chain extending along said trough and through said housing about said pulley, said chain having feed engaging portions moving in a horizontal path along said trough and in substantially the same horizontal path about said pulley, said pulley having spaced chain engaging portions with clearance therebetween for receiving said feed engaging portions of said chain, said chain within said housing having cooperation with said chain engaging portions of said pulley and at least one of the feed engaging portions of said chain being in said clearance between said chain engaging portions.

9. A stock feeder of the type having a continuous circuit, a conveyor therefor comprising an open-top trough merging into a direction changing housing, a pulley mounted for turning movement in said housing on a substantially vertical axis, a kink-proof chain traveling along said trough and through said housing about said pulley, said chain having feed engaging portions moving in a horizontal path along said trough and in substantially the same horizontal path about said pulley and at least partially within the outer periphery of said pulley, said chain having at least portions of its feed engaging portions moving within the path of movement of said chain and about the periphery of said pulley within the plane of turning movement of said pulley.

10. A stock feeder according to claim 9 wherein the portions of said feed engaging portions of said chain moving within the outer periphery of said pulley drivingly associate said chain and pulley for turning said pulley about its substantially vertical axis by the travel of said chain.

11. A stock feeder according to claim 9 wherein there is means comprising a driving sprocket having a shaft mounted for rotation on a substantially horizontally axis and overlying and extending across the direction of movement of said chain and operatively associated with said chain for advancing it along said trough and through said housing.

12. A stock feeder of the type having a continuous circuit, a conveyor therefor comprising an open-top trough merging into a direction changing housing, a pulley mounted for turning movement in said housing on a substantially vertical axis, and a kink-proof chain travelling along said trough and through said housing about said pulley, said chain having feed engaging portions moving in a horizontal path along said trough and in substantially the same horizontal path about said pulley, said pulley operating within said direction changing housing and said horizontal path of movement of said chain being within said trough and direction changing housing with said chain and said feed engaging portions in substantially the plane of said pulley, said chain having operative cooperation with said pulley for turning said pulley about its substantially vertical axis by the travel of said chain whereby with the operation of said chain and pulley within said direction changing housing to prevent undue packing and overflow of the feed at said direction changing housing.

13. A stock feeder of the type having a continuous circuit, a conveyor therefor comprising a trough merging into a direction changing housing, a pulley mounted for turning movement in said housing on a substantially vertical axis, a kink-proof chain travelling along said trough and through said housing about said pulley, said chain having feed engaging portions moving in a horizontal path along said trough and in substantially the same horizontal path about said pulley and at least partially within the outer periphery of said pulley, said chain having at least portions of its feed engaging portions moving within the path of movement of said chain and about the periphery of said pulley within the plane of turning movement of said pulley.

14. A stock feeder according to claim 8, wherein there is a driving sprocket having a shaft mounted for rotation on a substantially horizontal axis and overlying and extending across the direction of travel of said chain and operatively associated with said chain for advancing it along said trough.

15. A stock feeder according to claim 8, wherein there is a driving sprocket having a shaft mounted for rotation on a substantially horizontal axis and overlying and extending across the direction of travel of said chain and operatively associated with said chain for advancing it along said trough, said chain moving in a horizontal path and at the same horizontal level where it enters and leaves position beneath said sprocket, said trough having a bottom portion cooperating with said chain beneath said sprocket to maintain said chain in driving cooperation with said sprocket.

16. A stock feeder according to claim 8, wherein there is another conveyor comprising an open-top trough with a portion of said trough of said other conveyor contiguous to a portion of the trough of said first mentioned conveyor, an endless chain extending along said trough of said other conveyor, and driving means comprising a plurality of driving sprockets having a common shaft mounted for rotation on a common substantially horizontal axis and overlying and extending across the directions of travel of said chains at the contiguous portions of said troughs, one of said sprockets being operatively associated with each chain for advancing said chains along said troughs.

17. A stock feeder according to claim 8 in which the open-top trough of said first-mentioned conveyor extends in different directions on a first horizontal level and therein there is a second open-top trough extending in different directions on a second horizontal level, means for feeding stock feed into said troughs, an upwardly extending conduit connecting said trough at said first horizontal level with said trough at said second horizontal level, an endless kink-proof chain extending along said first and second troughs and said conduit and moving in different directions on said first horizontal level and in different directions on said second horizontal level and along said upwardly extending conduit, said chain having feed engaging portions moving in horizontal paths along said troughs and in substantially the same horizontal paths in its different directions of movement on said first and second horizontal levels, and driving means operatively associated with said chain for advancing it along said troughs and said conduit.

18. A stock feeder according to claim 8 in which said open-top trough extends in different directions on the same horizontal level and wherein there is a driving sprocket having a shaft mounted for rotation on an axis overlying said same horizontal level of movement of said chain in different directions and operatively associated with said chain for advancing it along said trough.

19. A stock feeder according to claim 8 in which said open-top trough extends in different directions on the same horizontal level and wherein there is a driving sprocket having a shaft mounted for rotation on an axis overlying said same horizontal level of movement of said chain in different directions and operatively associated with said chain for advancing it along said trough, said sprocket being split to form opposite spaced sides for movement of a portion of said chain therebetween.

20. A stock feeder according to claim 8 wherein there is a feed hopper overlying said chain and having a discharge outlet for delivering feed to said chain and the feed engaging portions thereof, spaced guides between which said chain moves adjacent to the bottom of said hopper, and a gate biased against the ends of said guides and effective to scrape excessive amounts of feed from said chain in its movement from said guides.

21. A stock feeder according to claim 8 wherein there is a scraper effective to scrape excessive amounts of feed from above said chain in its movement along said trough.

References Cited in the file of this patent

UNITED STATES PATENTS

| | | |
|---|---|---|
| 238,637 | Blevin | Mar. 8, 1881 |
| 312,341 | Duryea | Feb. 17, 1885 |
| 351,014 | Wissler | Oct. 19, 1886 |
| 365,171 | Dodge | June 21, 1887 |
| 1,074,182 | Jorgenson | Sept. 30, 1913 |
| 2,282,534 | Sinden | May 12, 1942 |
| 2,302,314 | Haggart | Nov. 17, 1942 |
| 2,522,449 | Inman | Sept. 12, 1950 |
| 2,525,654 | De Ville | Oct. 10, 1950 |
| 2,556,182 | Hapman | June 12, 1951 |
| 2,563,321 | Dugan | Aug. 7, 1951 |
| 2,589,690 | Graetz | Mar. 18, 1952 |
| 2,589,706 | Kitson et al. | Mar. 18, 1952 |
| 2,613,641 | Cordis | Oct. 14, 1952 |

OTHER REFERENCES

Automatic Poultry Feeder Plan, Progress Report #2, September 1948, Pennsylvania State College, School of Agriculture, Agricultural Experiment Station.